Sept. 4, 1928.   1,683,136
C. F. JENKINS
METHOD OF AND APPARATUS FOR CONVERTING LIGHT
IMPULSES INTO GRAPHIC REPRESENTATIONS
Filed April 22, 1926
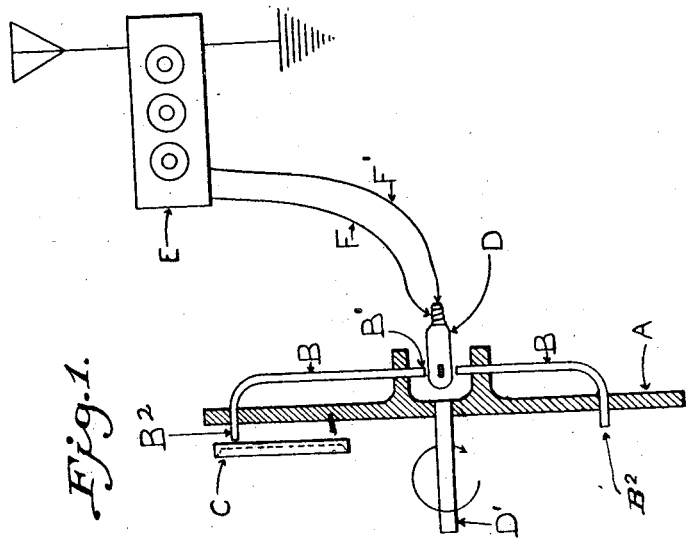
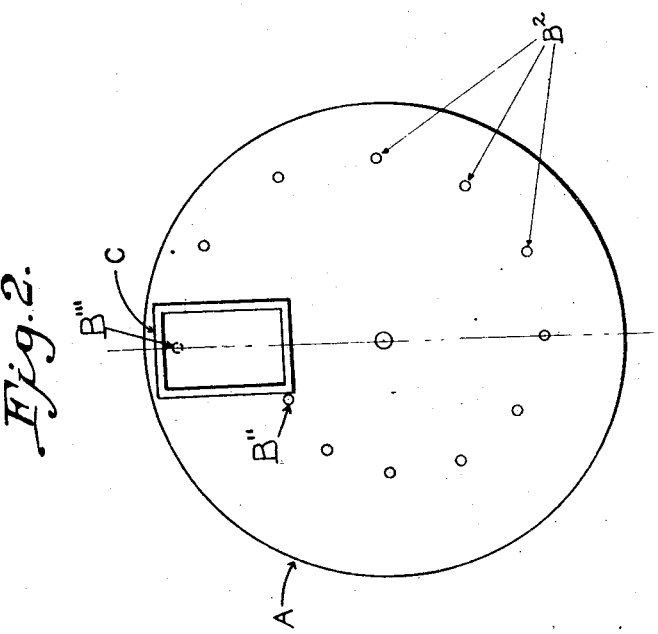
Inventor
Charles Francis Jenkins
WITNESSES Patented Sept. 4, 1928.

1,683,136

UNITED STATES PATENT OFFICE.

CHARLES FRANCIS JENKINS, OF WASHINGTON, DISTRICT OF COLUMBIA.

METHOD OF AND APPARATUS FOR CONVERTING LIGHT IMPULSES INTO GRAPHIC REPRESENTATIONS.

Application filed April 22, 1926. Serial No. 103,692.

This invention relates to methods and apparatus for converting electrical impulses into graphic representations particularly those transmitted at a rate of speed which when viewed by an observer will appear as the original representation of composites and in cycles of speed of transmission to give persistence of vision and the appearance of a moving object similar to that commonly known as moving pictures.

This invention is premised on the observation that visual representations may be converted into pulsating electrical current varying in intensity as fractional areas of a visual representation vary to predetermined areas thereof and that the current so transmitted may be reconverted into a pulsating light which may be distributed to display a visual representation, and the further observation that radio frequency oscillation may be utilized for obtaining pulsating effects whether transmitted through the ether, to avoid the distribution of conductors or over well defined paths of conduction commonly termed wired-wireless.

The invention is further premised on the observation that rapidly pulsating light distributed over predetermined areas may be given the effect of a visual representation and the further observation that an exceedingly high degree of pulsation of current may be utilized to create a rapidly pulsating light which, in turn, may be distributed to display a visual representation through the agency of light confining or conducting elements.

This invention therefore has for an object thereof the provision of a method for converting a primary pulsating light of intensity varying as fractional areas of a visual representation vary to predetermined portions thereof, and distributing said light to conducting or confining elements so that there is presented a visual representation or light arranged to display a reproduction of the original image, or a record energized by said light conductors or confining elements representing the original.

The invention further contemplates the provision of a method of converting a pulsating light varying in intensity as fractional areas of the visual representation vary to predetermined areas thereof, by converting the light thereof through the use of light confining or conducting elements arranged to display light within limits giving persistence of vision, thus giving a composite simulating a reproduction of the original image. The invention also contemplates transmitting light impulses in cycles of composite visual representations so that light confining and conducting elements arranged to display corresponding light pulsations will give not only persistence of vision of a composite but also various phases of the composite giving the effect of what is commonly termed moving pictures.

The invention still further contemplates distributing pulsating light varying in intensity as fractional areas of the visual representation vary to the predetermined areas thereof, to a plurality of light confining and conducting elements which are given a speed of movement to give within limited areas impulses of light displays at the rate giving persistence of vision simulating a composite representation.

In the more particular embodiment of my invention provision is made to convert pulsating current varying in intensity as fractional areas of a visual representation vary to predetermined areas thereof, to light having equivalent pulsations, interruptions and variations in intensity, and distributing the light thereof to light conducting and confining elements, the method including arcuately moving said elements so that parts thereof describe a series of parallel arcs, the length of the radii thereof varying as the radial displacements of a spiral relatively to the center, whereby a composite representation will be presented. The method also includes converting the pulsations of current and the light generated thereby in cycles representing various composites, whereby varying composites will give the appearance of what is commonly termed motion pictures.

In a still further particular embodiment provision is made to convert pulsating current varying in intensity as fractional areas of a visual representation vary to predetermined areas thereof, to light having equivalent pulsations, interruptions and variations in intensity, and distributing the light to light conducting or confining elements which are arranged to display within limited areas a composite representation simulating the original, whether due to the light itself, a reflection thereof or a temporary indication, or a more or less permanent record.

The invention still further has for an object thereof, the provision of a device for transmitting visual representations by combining with means capable for furnishing a pulsating current varying in intensity as fractional areas of a visual representation vary to predetermined areas thereof, of a light generating element adapted to be energized by the pulsating current and having equivalent pulsations, interruptions and variations in intensity and display elements for said light pulsations having persistence of vision simulating the original whether due to the light itself, a reflection thereof, or a temporary indication or a more or less permanent record.

The invention contemplates as an object thereof the provision of a device in combination with means for producing a pulsating current, of light energized by said current and having equivalent pulsations, interruptions and variations in intensity, and light conducting and confining elements displayed arcuately within limited areas of observation in a series of arcuately arranged parallel lines having persistence of vision and simulating a visual representation of a character similar to the original.

In a more particular embodiment of my device visual representations are presented by combining with an electrical circuit adapted to supply a pulsating current varying in intensity as fractional representations of a visual representation vary to predetermined areas thereof, of a light generating element energized by said current and of a plurality of light conducting and confining elements mounted for rotatable movement with reference to said light generating element to display pulsations of light in a transverse plane whereby a composite representation will be presented within limited areas, the apparatus contemplating receiving cycles of pulsations representing composites in degrees of variations having persistence of vision and simulating a series of representations of a character commonly termed motion pictures whether due to direct display of the light itself, a reflection thereof or of a temporary indication or a more or less permanent record.

It is further contemplated by means of the device herein provided to magnify the visual effects of light pulsations by extending the same over a length of path, thus giving apparent greater persistence of vision, and distributing the same over an area, thereby simulating a visual composite of the original without altering the spaced time relation of the pulsations or their original intensity. This I may accomplish by directing light pulsations through a plurality of light conducting and confining elements, including vitreous material, as quartz, boro-silicates, ordinary glass and similar light conducting bodies, from a single light source which appears at the original point of observation to be incapable of displaying any variation in intensity or pulsation.

In the attainment of the foregoing objects together with such further objects and additional benefits and advantages as may hereinafter appear or be pointed out, I have provided a construction, one embodiment of which is illustrated in the accompanying drawing, wherein Figure 1 is a schematic representation of a receiving and displaying device, and Figure 2 is a front elevation of a part of the device of Figure 1.

In the practice of the invention, a receiving device is provided preferably capable of being controlled by radio frequency oscillations generated by a sending station commonly used for wireless telephony to obtain pulsating current varying in intensity as fractional areas of a visual representation vary to predetermined portions thereof and converting the same into light impulses. It will be understood, however, that the receiving device may be controlled by a transmitting station making use of one or more conductors other than the ether for generating the pulsating currents of the character mentioned and for certain purposes the so-called "wired-wireless" circuits may be utilized.

The pulsations of current utilized are not only of a character varying in intensity as regards a single composite visual representation but may be in cycles of pulsations representing a series of variations of visual representation transmitted at a speed within limits giving persistence of vision and simulating various stages of what is commonly referred to as motion pictures.

The pulsations of current so received are used to energize a light generating element which the light whereof is arranged to be distributed over an area whereby the pulsations thereof give persistence of vision representing a composite visual representation simulating in character that of the original. The impulses of light may be utilized directly but in order to magnify the same when concentrated at a single light generating element, the pulsations thereof are distributed to a light confining or conducting element moving rapidly relative to said light and preferably made of vitreous material such as quartz, boro-silicates, glass or the like which are adapted to conduct the light substantially unaltered in dimensions at their terminals. Terminals so displayed as a result of light conducted therethrough may, in themselves, give a visual representation simulating the original or they may be reflected upon a screen to give a temporary indication or a more or less permanent record by impressing the light impulses upon a photo-chemical plate or film.

In the preferred embodiment of my invention, the method of picture transmission includes distributing pulsations of current of the character referred to, to a light generating element which is caused to produce light having equivalent pulsations, interruptions and variations as the energizing current and distributing said light to a plurality of light conducting and confining elements whose termini move in a series of parallel lines within a limited area, giving persistence of vision representing a composite visual image.

For the practice of the method above described, I have utilized a device adapted to receive pulsations of current and for this purpose I may utilize well known radio receiving apparatus, generally referred to as E, and which is arranged to convert the transmitted currents of radio frequency oscillation into corresponding currents capable of energizing a light generating element. The output of the receiver E is led to a light generating element by means of the leads F and F'. Preferably a light element or lamp is utilized which has a high frequency light change value and capable of responding to very small radio currents.

Mounted upon a disk A there are provided a plurality of light conducting and confining elements, generally referred to as B, and of a form to conduct light from a central point to the plane of the disk. These elements are generally L-shaped, one terminal thereof, $B^1$ of each, being directed at the axis of the disk at which point there is located the light generating element D mentioned. The other terminals $B^2$ are at substantially right angles in the plane of the disk. Thus by rotating the shaft D' when light is pulsating through the lamp D, the light conducting elements will receive light in accordance with the pulsations of said lamp.

The terminals $B^2$ of each of the light confining elements will display pulsations of light varying in intensity as fractional areas of the original visual representation vary to the entire area thereof and due to the movement imparted by the rotating disk, will have persistence of vision and multiplication of the pulsation of light at the origin in the lamp D. It will be observed that the terminals $B^2$ are preferably ground, presenting at their termini a screen effect reflecting the pulsation of light conducted to these points.

In a further modification a display screen may be positioned at the termini of the light confining elements to display a composite representation of the plurality of rapidly moving light confining elements.

In a further embodiment of my invention, the luminous portion of the lamp D is positioned so as to subtend a predetermined segmental portion of the disk. When so arranged, I prefer to locate the light display or recording screen C within the segmental portion receiving the light impulses and in order that the light pulsations at the termini $B^2$ display their luminosity within limited areas or the confines of the screen, the outwardly directed terminals $B^2$ are arranged so that the radial distance from the axis corresponds to the lengths of the radii of corresponding points of a spiral. Preferably, the radial displacement of the light confining elements is such as to vary between the shortest radius B'' and the longest radius B''' as the width of the screen C. By this construction, the termini in the plane of the disk will describe a series of parallel lines within the limits of the screen. It will be understood that the pulsations of light are so timed with the rotation of the disk so that each revolution will display a series of pulsations of light representing a single composite. The visual persistence of these composites may be accentuated by repeating the pulsations in accordance with each single composite. However, in order to transmit what may be termed a motion picture effect the pulsations are made to correspond to cycles of composites, each cycle varying in reference to a subsequent cycle in amounts sufficient to display the pulsations of light as the movements of the original moving object or visual representation.

It will be observed that to obtain persistence of vision these cycles of pulsations may be transmitted at the rate of 960 per minute or more frequency wherein each cycle the pulsations are repeated to give greater persistence of vision to each composite and that the display device is synchronized accordingly.

In the construction shown it will be observed that within the limits of the screen there are displayed a plurality of light lines arcuately disposed and that as the pulsations vary, the lines within their limits will assume varying degrees of illumination and when these lines have traversed the entire area, will represent a composite visual image simulating the original due to the high speed of revolution of the light distributing and confining elements, the termini of which project within the area of the screen.

It will be observed that by the construction shown I am enabled to accurately and without disproportionment of the original light pulsations direct the same in close proximity to the screen or a recording element, where magnification is only obtained due to the movement of the display and persistence of vision.

It will be observed that with an increase of vectorial displacement of the inwardly directed termini of the light confining elements from the axis of rotation and with uniform rotation of the light confining elements the termini displaced furthest from the axis of the rotating member will indicate a greater number of pulsations per degree of rotation than those located near the axis and for this reason the control of the pulsating light and the transmission thereto will correspond accordingly so as to give a uniform distribution of light within the screen area.

Having thus described my invention and illustrated its use, what I claim as new and desire to secure by Letters Patent, is—

1. In a device for transmitting visual representations, the combination with a light source adapted to supply a pulsating light varying in intensity as fractional areas of a visual representation vary to predetermined areas thereof, a display screen therefor and means for directing the light of said source successively upon said screen, comprising a plurality of light confining elements the major portion of the length of said elements lying longitudinally in a common plane, and whose termini are arranged in a spiral path whereby a composite representation is displayed in a predetermined area.

2. The method of scanning a plane which includes the step of distributing light from a light source through a channel of sharp light boundary from end to end during relative movement of the light source and the channel.

3. The method of scanning a plane which consists in distributing light from a light source through a plurality of channels of sharp light boundary from end to end and in approximately a single plane during relative movement of the light source and the channels.

4. The method of scanning a plane which consists in distributing light from a light source through a plurality of channels of greater refractive boundary than the surrounding medium during relative movement of the channels and the light source.

5. The method of scanning a plane which consists in distributing light from a light source through a plurality of channels of highly refractive boundary from end to end during relative movement of the channels and the light source.

6. The method of scanning a plane which consists in distributing light from a light source through a plurality of channels of sharp light boundary and approximately uniform in cross section from end to end during relative movement of the channels and the light source.

7. The method of scanning a plane which consists in distributing light from a light source successively through a plurality of channels, each of sharp light boundary from end to end during relative movement of the channels and the light source.

8. The method of scanning a plane which consists in distributing light from a light source through a plurality of channels of uniform density and of greater density than the surrounding medium during relative movement of the channels and the light source.

9. The method of scanning a plane which consists in distributing light from a light source through a plurality of channels of greater refractive index than the surrounding medium during relative movement of the channels and the light source.

10. The combination of a light source, a light conducting rod for distributing light from said source and means for moving one of said parts relative to the other.

11. The combination of a light source, a plurality of light conducting rods radiating from said source for distributing light from said source, and means for rotating said rods.

12. The combination of a light source, a plurality of light conducting rods arranged radially for distributing light from said source, and means for rotating said rods, the latter having their outer ends arranged spirally.

13. The combination of a rotary carrier provided with a plurality of light conducting rods arranged radially and having their inner ends spaced apart, the outer terminals of the rods being arranged in a spiral path, and a light source located adjacent the inner ends of the rods.

14. The combination of a light source, a light conducting element having a sharp light confining boundary associated with said light source for distributing a substantially uniform cross-sectional beam of light therethrough from end to end, and means for effecting relative movement of the light source and said element.

15. The combination of a source of light, a relatively long light element having a sharp light confining boundary throughout its length to distribute light from said source, and means for effecting relative movement of the light source and said element.

16. The combination of a light source, and a single element for distributing light from said source to a point remote therefrom, said element being continuous from adjacent the light source to the point where the light is emitted, and means for effecting relative movement between the light source and said element.

17. The combination of a rotatable member, a light source disposed substantially centrally thereof and relatively close thereto, a light conducting element supported on said rotating member, said element adapted to conduct light from end to end thereof, and means whereby to rotate said rotatable member, said light conducting element being arranged radially of said light source with its inner end relatively close to the latter whereby upon rotation of said member the said element has a greater movement at its outer end than at its inner end.

In testimony whereof I have hereunto signed my name.

CHARLES FRANCIS JENKINS.